Figure 2:
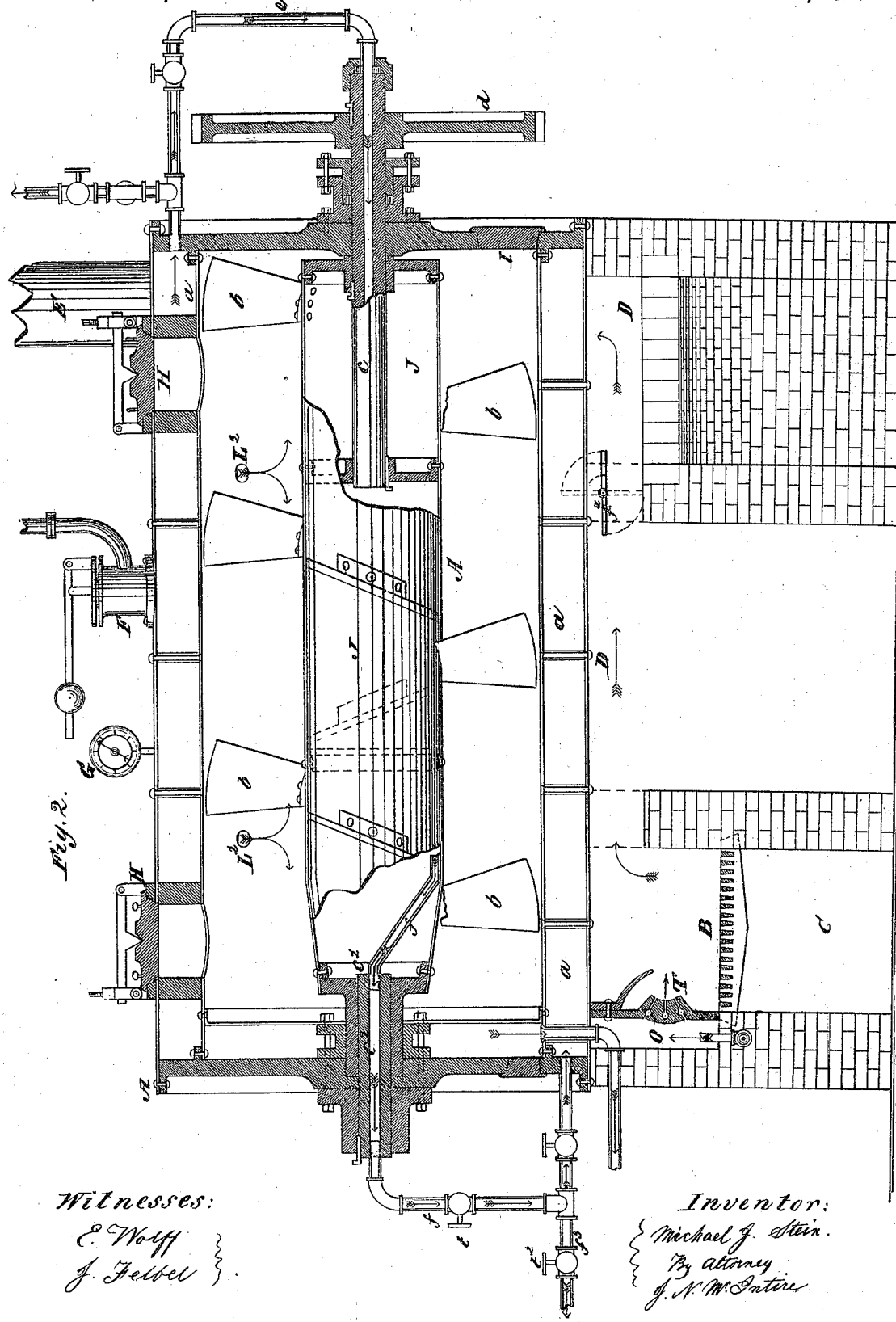

M. J. STEIN.
Improvement in Apparatus for Drying and Curing Animal and Vegetable Substances.
No. 124,982. Patented March 26, 1872.
3 Sheets--Sheet 1.
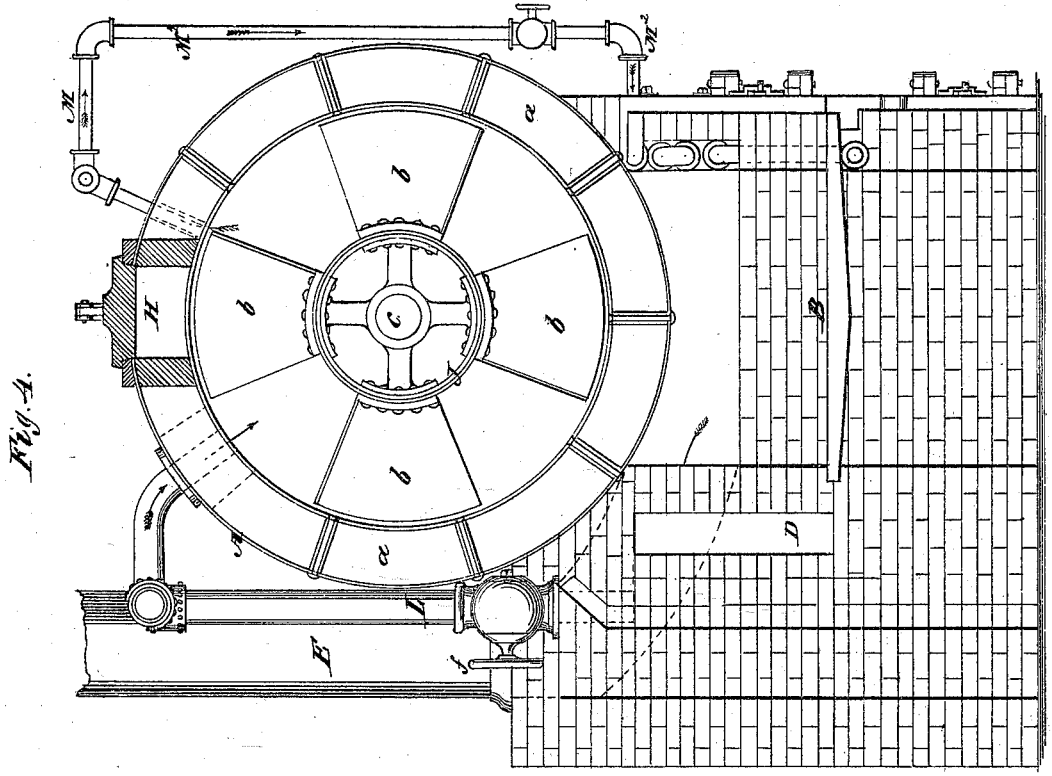
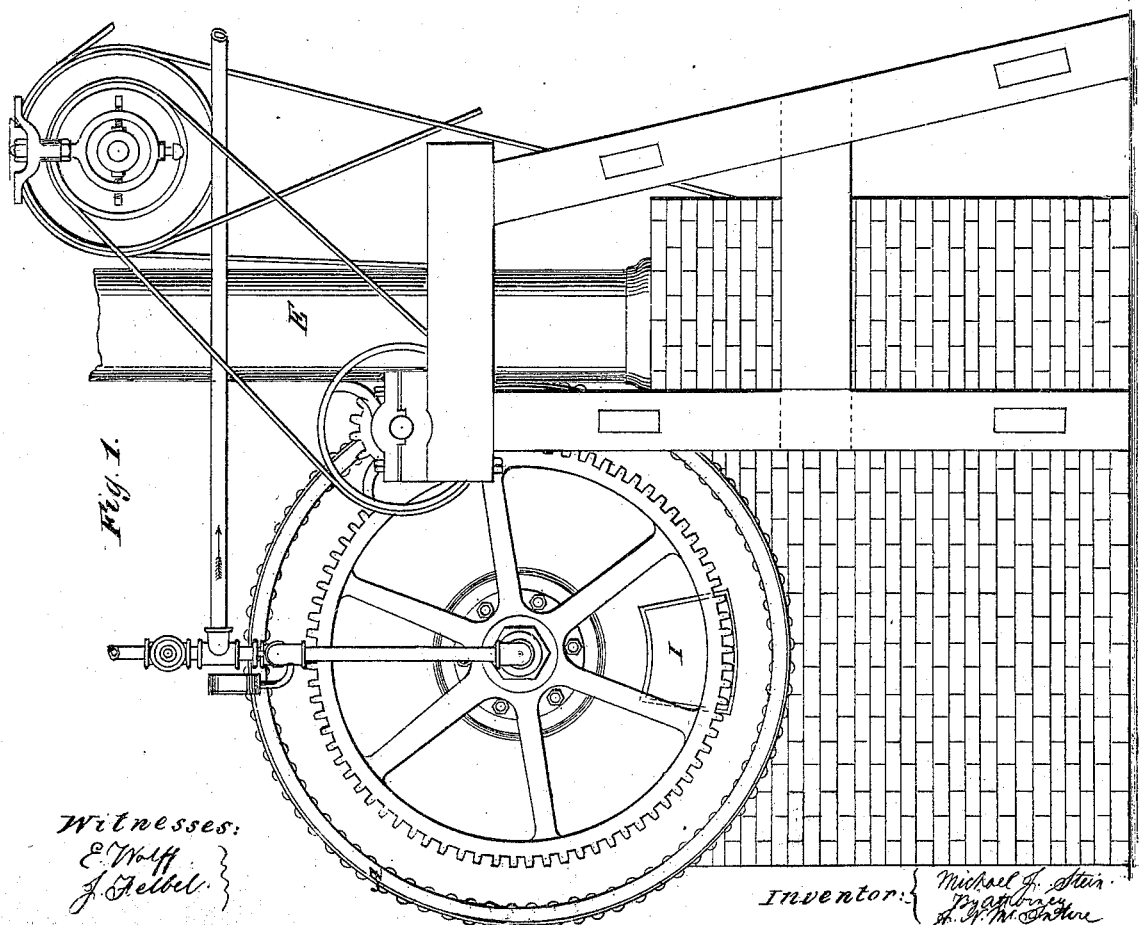
Witnesses:
E. Wolff
J. Felbel
Inventor:
Michael J. Stein M. J. STEIN.
Improvement in Apparatus for Drying and Curing Animal and Vegetable Substances.

No. 124,982. Patented March 26, 1872.

Witnesses:
E. Wolff
J. Felbel

Inventor:
Michael J. Stein.
By attorney
J. N. McIntire

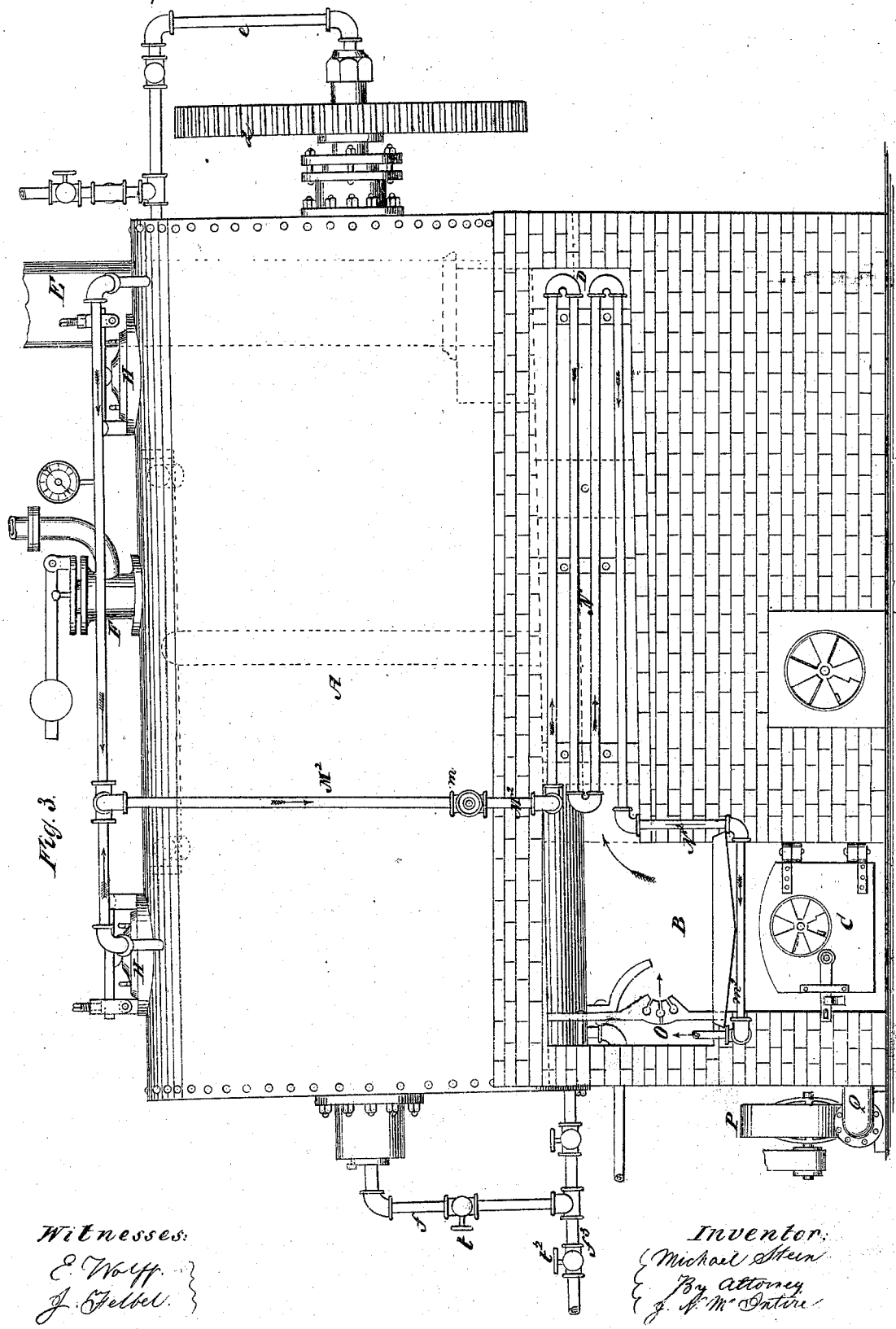

124,982

UNITED STATES PATENT OFFICE.

MICHAEL J. STEIN, OF NEW YORK, N. Y.

IMPROVEMENT IN APPARATUS FOR DRYING AND CURING ANIMAL AND VEGETABLE SUBSTANCES.

Specification forming part of Letters Patent No. 124,982, dated March 26, 1872.

*To all whom it may concern:*

Be it known that I, MICHAEL J. STEIN, of New York city, in the county and State of New York, have invented a new and useful process of drying and curing or preserving any and all sorts of materials and substances from which it is desired to extract or expel all contained moisture; and I do hereby declare the following to be a full, clear, and exact description of my new process; and also of an apparatus suitable for carrying on said process, reference being had to the accompanying drawing forming part of this specification.

In all the processes of which I have any knowledge for artificially drying or expelling all contained moisture from any and all sorts of substances and materials and articles, to either render the substance treated merchantable, or more valuable, or more lasting, or to preserve it in a certain condition as the case may be, the principle involved, that of "kiln drying," is about the same.

A great variety of apparatus and forms or modes of carrying out processes of drying, curing, seasoning, and preserving have been suggested, made the subjects of patents, and applied to the treatment of various materials and articles; but in all of the known or practiced processes with which I am familiar, it has been the practice to permit the free escape of the products expelled by the heat applied and free admission of air to the substance being treated.

In the treatment of lumber it has been customary sometimes to subject the wood to the action of steam to drive out the sap, and then perform the usual "kiln-drying process," in which the material is open to the action of surrounding influences, and the heating medium is free to escape continually.

The processes heretofore practiced are subject to many and serious objections, among which may be named the expense consequent to the generation and continual escape or loss of the heat necessary to produce the desired results and the effect of drying the exterior of the material or article treated, and closing its pores against the escape of moisture and gases from the interior or heart, and, in some cases, (as for instance lumber) the "checking" or cracking of the surface after having been subjected to the usual treatment of drying.

My invention has for its main object to overcome these objections and provide a means for effecting, in an economical manner, a more thorough and desirable drying or curing of various articles and materials than has heretofore been or can be attained to by the known processes of treatment; and to these ends my invention consists in subjecting the substance or article to be treated to the action of heat to be applied, and the effects of the steam and gases generated in a tight or perfectly-closed vessel, whereby I am enabled to first convert into steam, vapor, or gases any contained products which can be distilled out of the material being treated, and then utilize the effects of these products of distillation (or the products expelled) by treating them to a high degree, at the same time preventing any condensation within the vessel containing the material, or the entrance of any cooling medium, as I will hereinafter more fully explain. And my invention further consists in certain improvements in apparatus for the drying, curing, seasoning, &c., of various materials, articles, or substances hereinafter more particularly described.

To enable those skilled in the art to make and use my said invention, I will proceed to more fully describe my new process and my improved apparatus, referring by letters to the accompanying drawing, in which—

Figure 1 is a front elevation; Fig. 2, a longitudinal section; Fig. 3, a vertical longitudinal section; and Fig. 4, a vertical cross-section of an apparatus, such as I have designed for carrying out or practicing my new process in connection with other operations forming no part of the invention made the subject of this application.

The apparatus shown is adapted to perform the operations of rendering and extracting the fat and water from animal matters, and also drying and pulverizing scrap, and coagulating, drying, and pulverizing animal blood; but I need here only allude to those which are necessary for and are used in the drying process.

A represents a cylindrical tank or vessel, made of boiler-iron, and in the form of a cylindrical shell, as clearly illustrated. It is mounted in brick-work (after the fashion of a steam-boiler,) in which are formed the usual furnace B, ash-pit C, and flues or heat passages D, which lead into an ordinary chimney or smoke stack, E. The cylindrical shell portion or space $a$ of the vessel is adapted to receive a supply of water, which, by the action of the fire in furnace B, is generated into steam to heat, and dry by radiation, the material contained in said tank A. An ordinary safety-valve may be provided at F, and a steam-gauge at G, as in the construction of steam-boilers, and for the same purposes. H H are two man-holes in the top of the vessel A, made in the usual manner, and which may be opened for the introduction of the material to be treated, and may be closed air-tight in the customary way. Another man-hole, I, may be provided at one end (near the bottom) of the vessel A for the convenient discharge or removal of material from the vessel. J is a hollow drum, mounted axially in the cylinder A. It is supplied with steam from the steam-space or shell $a$ of the cylinder or tank, (as will be presently explained,) and is provided with arms $b$, which act as agitators or stirrers when required, and when the said drum J is rotated on its axis (as it may be through the medium of its shafts or journals $c$ $c^2$ and a driving-gear, $d$, to which any suitable motive power may be applied.) $e$ is a tube or pipe leading from the upper part of the shell (or steam-space) of the cylinder A into shaft C of the agitator-drum, for supplying steam to the latter, (as indicated by the arrows at Fig. 3,) to heat it, and $f$ is a pipe, leading from the journal $c^2$ into the lower or water-space portion of shell $a$, for permitting a free passage of the steam from drum J into the lower part of the boiler or shell $a$, (as per arrows, Fig. 3.) This pipe $f$ is arranged as seen, so that the end of it enters the rotary drum J, extends down to the lowest part of the circumference of said drum, while the other portion passes into or through the (stationary) journal $c^2$; thence downward to communicate, as shown, with the lower part of the boiler, and also with an exit-pipe, $f^3$, (used to draw off the water when necessary.) At $t$ and $t^2$ are cocks, the former to make or break the communication between drum J and the lower part of shell $a$, the latter to open and close the exit-pipe $f^3$.

It will be understood that by the arrangement of the escape-pipe $f$ in the manner shown and described, a siphon is formed, by which any accumulation of water of condensation in the drum J, not forced out with the steam, may be drawn off. The pressure of steam in the drum J will have a tendency to force any water contained up through the tube $f$; but in the event of an undue accumulation of water, and the absence of sufficient pressure, the pipe $f$ being filled with water by opening the cock $t^2$ the pipe $f$ will draw off the contents of the drum J clear down to the level of that end of tube $f$ which enters and rests close to the bottom of the drum J; and it will be seen that by this arrangement of the tube and drum the latter may be made of large diameter (to get great heating surface,) while the journal $c^2$ is of small diameter, and at the same time no difficulty be encountered from the collection and retention of water (of condensation) in the drum.

L are pipes, which lead from the hot-air flues of the furnace to and communicate with the interior of the cylinder or closed vessel A near its upper part. These pipes are provided with valves or cocks at $f$, by means of which the communications between the furnace flues and the interior of vessel A may be opened and closed at pleasure, for purposes to be presently explained. M are tubes, which lead from the interior of the vessel A, near its upper part and, through the tube $M^2$, connect with a superheater, N, which leads off, at $N^2$, under the furnace and into a chamber, O, for purposes to be presently explained. P is a fan-blower, which may be driven in the usual manner from any suitable motor, and which is used to force air into or supply a blast to the furnace, and thence into and through the cylinder $a$. In the flue D is arranged, at $f^2$, a valve or damper, the office of which will be presently explained.

With the foregoing description of the several parts of the apparatus, the following explanation of the process and operation will make clear my whole invention. The material to be dried, or treated for the extraction of all moisture, is placed in the cylinder $a$, A and the man-holes all closed air-tight, and, the shell or boiler portion $a$ being supplied with the proper quantity of water and the furnace started, the shell of cylinder A is heated up to the requisite temperature. By the heat radiated within the cylinder (or in the vessel containing the material being treated) the water or moisture contained in the material will be converted into steam, and this steam may be retained in the air-tight vessel A, together with the material, until it has become comparatively or quite dry (from the action of the heat,) when it will assist in the drying of the material, as will, also, any gases which may be generated from the material. As the vessel A is perfectly closed or hermetically sealed, no air or other cooling medium can enter, and the confined steam and gases are utilized in the drying out of the material under treatment, and the process thus rendered very economical. When it is desired or necessary to permit the escape of the steam and gases from the closed vessel A the cock $m$ in pipe $m^2$ is opened and their escape permitted, through pipes $m$ $m^2$, into the superheater N. Here they are highly superheated, and from the superheater pass through pipe $N^2$ to the chamber O, to be utilized, as will be presently explained, to assist in producing combustion in the furnace B. It will be seen that, as there is no communication between the interior of vessel A and anything except the superheater N, to permit the escape, when necessary, of the comparatively dry steam and gases, there can be no cooling influence upon the vessel A sufficient to render necessary much additional generation of heat to keep up and carry on the process; and it will be understood that since the material is confined in the vessel until the processes of generating into steam all contained moisture and converting this steam to a dry condition are completed, the pores of the material being treated are kept open until every particle of moisture and steam containing moisture has been expelled from the mass; and it will be understood that, in thus treating the material, its pores must necessarily remain open for, or are kept open by, the passage outward from the heart of the mass of both the generated steam (or saturated steam) and the dried steam after generation. It may be expedient in the treatment of some substances or materials to employ within the vessel A, after the operations just described have been completed, a blast or pressure of hot air, to both carry off effectually any remaining gases and vapors, (which, if allowed to remain, might lead to some injurious effect,) and to insure the desired consummation in the drying process. This operation is effected by opening the valves $f$ in the hot-air pipes L, closing damper $f$ in the flue D and putting the blower P in motion, when a blast and circulation will be induced, as follows: The air forced into the fire will induce a current of hot air, under pressure, which, having no escape through the flue D now, will be forced up through pipe L and into the vessel A, through the communications at 1, as indicated by the arrows at Fig. 3. From the vessel A the forced current, mingling with and carrying off any remaining gases and vapors, will pass through the pipes M M² into the superheater, and thence to chamber O, from whence they will pass through the argand burner T, to mingle with the fresh blast and assist combustion in the furnace; and so on, the hot air will pass into and out of the vessel A, and a mechanical and chemical action will be continued, which will relieve the vessel A of all gases and vapors, and leave the materials, when these operations cease, perfectly dry.

The duration of the several described operations, the temperature to be created, &c., will, of course, vary necessarily with the character of the materials being treated, and according to the results desired to be accomplished, and must be governed according to experience and the judgment of the operator.

It is not material, in carrying out my new process, whether the introduction of the hot blast be always employed after the first described operations are gone through with, though, in the treatment of some kinds of materials, this part of the process may be very useful, or indispensable to the production of the best possible results; nor is it necessary, in the practice of my new process, that such an apparatus as shown be used, as other and very different machinery may be employed for carrying out the part of my invention which relates to the process or mode of treatment, the gist of which rests in the idea of treating the material in a hermetically-closed vessel, in substantially the manner described—that is to say, so that all the contained moisture is generated into steam, and all gases evolved confined and heated in the vessel and permitted to escape only in such manner as to exclude any possibility of the ingress to the vessel of any cold air or other medium which would tend to lower the temperature within the vessel.

In lieu of carrying the gases and vapors off, as described, through a superheater, to the fire, the vapors may pass to a condenser; but I deem the described method the most economical, as they are made to assist in the combustion, by which the heat for the process is attained and maintained.

It will be understood that one of the great advantages gained by my new process is the economy of heat, and consequently of fuel, by keeping all the heat evolved in, and the vapors and gases obtained by, the distillation of the moisture, from the substance treated within the closed vessel, and there using it to assist in the drying-out of the material, as well as to keep the pores open and induce to the extraction of all contained moisture, that another advantage is in avoiding any parching or "shriveling up" of the articles by drying the outer surfaces and having the heart imperfectly treated.

In the apparatus shown, changes in the details of construction may be made without departing from the spirit of that part of my present invention which relates to the machinery for carrying out my new processes.

Having fully described the nature and method of using my new process and the improved apparatus for conducting said process, and wishing it to be understood that both the process and apparatus may be used in the treatment of various materials, substances, or articles, what I claim as a new process for drying, seasoning, preserving, &c., of various materials is—

1. The treatment of the material in a closed vessel, so as to generate into steam the contained moisture, and expel also the saturated steam substantially as set forth.

2. I also claim the utilization, by means of argand burners connected with the furnace, of the gases and vapors evolved in the drying-chamber, to assist in the combustion going on in the furnace, by which said chamber is heated.

3. I also claim the introduction of blasts or currents of hot air after the operation of distillation, substantially as described.

And in the apparatus shown and described, what I claim as new is—

1. In combination with the receiver or drying-chamber and the furnace, suitable means of communication between the two, which can be opened and closed at pleasure, and by which the products of distillation can be made to pass from the chamber to the fire, substantially as and for the purposes described.

2. In combination with the drying-chamber or vessel and furnace, a damper to prevent the escape to the chimney of the products from the fire, a blower, and suitable communications between the hot-air flues of the furnace and the drying-chamber, whereby the products of combustion from the furnace may be forced into and through the drying-chamber, substantially as and for the purposes set forth.

3. In combination with the drum J, of larger diameter than its shafts or journals, a pipe, $f$, arranged to operate substantially as and for the purposes set forth.

In testimony whereof I have hereunto set my hand and seal this — day of March, 1872.

MICHAEL J. STEIN. [L. S.]

In presence of—
 GEO. S. GREENSWARD,
 J. FELBET.